United States Patent
Shitano (10) Patent No.: US 8,949,306 B2
(45) Date of Patent: Feb. 3, 2015

(54) APPARATUS CONNECTED TO NETWORK AND METHOD FOR REQUESTING ANOTHER APPARATUS TO PERFORM PROCESSING VIA NETWORK

(75) Inventor: Masaki Shitano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 286 days.

(21) Appl. No.: 13/197,220

(22) Filed: Aug. 3, 2011

(65) Prior Publication Data

US 2012/0036176 A1 Feb. 9, 2012

(30) Foreign Application Priority Data

Aug. 6, 2010 (JP) ................................. 2010-177498

(51) Int. Cl.
*G06F 15/16* (2006.01)
*H04N 5/225* (2006.01)
*G06F 9/50* (2006.01)

(52) U.S. Cl.
CPC .................................. *G06F 9/5027* (2013.01)
USPC ...................... 709/201; 348/207.1; 348/207.2

(58) Field of Classification Search
USPC ................ 709/201; 348/207.1, 207.11, 207.2
See application file for complete search history.

(56) References Cited

U.S. PATENT DOCUMENTS

| | | | |
|---|---|---|---|
| 6,104,886 A * | 8/2000 | Suzuki et al. .................. 396/429 |
| 2005/0052689 A1* | 3/2005 | Itsukaichi ..................... 358/1.15 |
| 2009/0187693 A1* | 7/2009 | Morozumi ..................... 710/313 |
| 2009/0222605 A1* | 9/2009 | Morozumi ..................... 710/106 |
| 2010/0118153 A1* | 5/2010 | Yu ............................. 348/207.11 |
| 2011/0149092 A1* | 6/2011 | Yokota ........................ 348/207.2 |

FOREIGN PATENT DOCUMENTS

JP 2007-164485 A 6/2007

* cited by examiner

*Primary Examiner* — Jeong S Park (74) *Attorney, Agent, or Firm* — Canon USA, Inc., I.P. Division (57) ABSTRACT

A second apparatus, which is connected to a first apparatus and a third apparatus via a network, transmits a signal to the third apparatus for preventing the third apparatus from stopping an operation in a case where the second apparatus requests the first apparatus to perform processing including an access to the third apparatus.

5 Claims, 7 Drawing Sheets

APPARATUS CONNECTED TO NETWORK AND METHOD FOR REQUESTING ANOTHER APPARATUS TO PERFORM PROCESSING VIA NETWORK

BACKGROUND OF THE INVENTION

1. Field of the Invention

The present invention relates to an apparatus connected to a network and a method for requesting another apparatus to perform processing via the network.

2. Description of the Related Art

In recent years, connections of various kinds of apparatuses such as mobile phones and home electric appliances, in addition to personal computers, to a network have been becoming feasible. There is Universal Plug and Play (UPnP™), as one of network technologies enabling establishment of such an environment. The UPnP™ technology is discussed in Japanese Patent Application Laid-Open No. 2007-164485.

The UPnP™ technology allows devices to automatically perform all of the following processing through participate in a network: dynamically acquiring an Internet Protocol (IP) address, notifying another device of its own device information, and acquiring information about the existence and functions of another device. As a result, it becomes possible to, for example, automatically display and print, content, a moving image, and a still image stored in an apparatus such as a digital camera from another apparatus such as a mobile phone or a digital television set connected via the network without arranging necessary settings therefor in advance.

Many of digital cameras and other kinds of apparatuses work on a battery, and most of them are equipped with the auto power-off function and the resume function. Further, in processing among three apparatuses in an UPnP™ system based on HTTP (hypertext transfer protocol), the transaction (statefull) function is not yet available. Therefore, in the above-described technology, the auto power-off function or the resume function of an apparatus may cause the apparatus to be shut off in the middle of processing among three apparatuses, resulting in a failure to complete the processing.

SUMMARY OF THE INVENTION

The present invention is directed to more effectively avoiding a failure to complete processing performed by at least three apparatuses operating in cooperation in a system including the at least three apparatuses connected via a network.

According to an aspect of the present invention, a method performed by a second apparatus connected to a first apparatus and a third apparatus for requesting the first apparatus to perform processing, includes transmitting a signal to the third apparatus for preventing the third apparatus from stopping an operation in a case where the processing requested to the first apparatus includes an access to the third apparatus, and requesting the first apparatus to perform.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
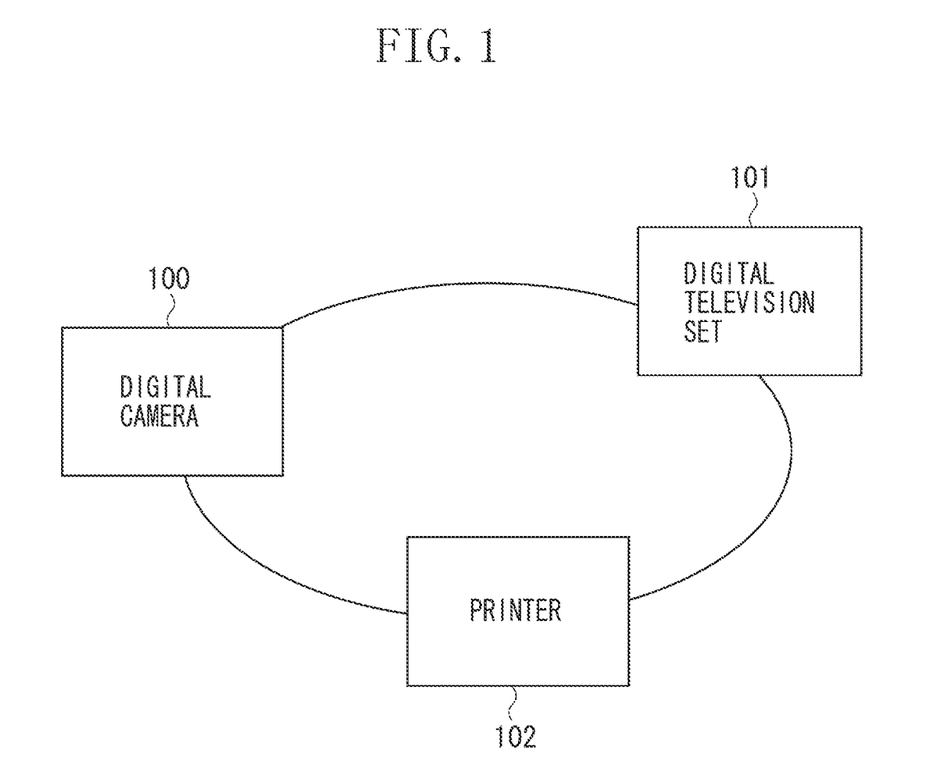
FIG. 1 illustrates an example of a configuration of a power source management network system.

FIG. 1 illustrates an example of a configuration of a power source management network system according to an exemplary embodiment of the present invention. The power source management network system is a system in compliance with the UPnP™ standard, and includes a plurality of apparatuses. In the following, the present exemplary embodiment will be described, based on an example including a digital television set 101, a digital camera 100, and a printer 102. These apparatuses are connected to one another via a network such as a wired local area network (LAN) or a wireless LAN, in such a manner that they can function in cooperation with one another. In the present exemplary embodiment, the system includes three types of apparatuses, one apparatus for each type. However, the present exemplary embodiment is not limited thereto. For example, the system may include a plurality of apparatuses for each type, and may include another type of apparatus. Examples of employable apparatuses include a mobile phone, an information processing apparatus (computer), a multifunction peripheral, and a router. Each apparatus is provided with resources required to execute a program, such as a calculation unit and a data storage unit, which also realize the control function for controlling the apparatus itself, the communication function for enabling communication, and other functions.

Figure 2:
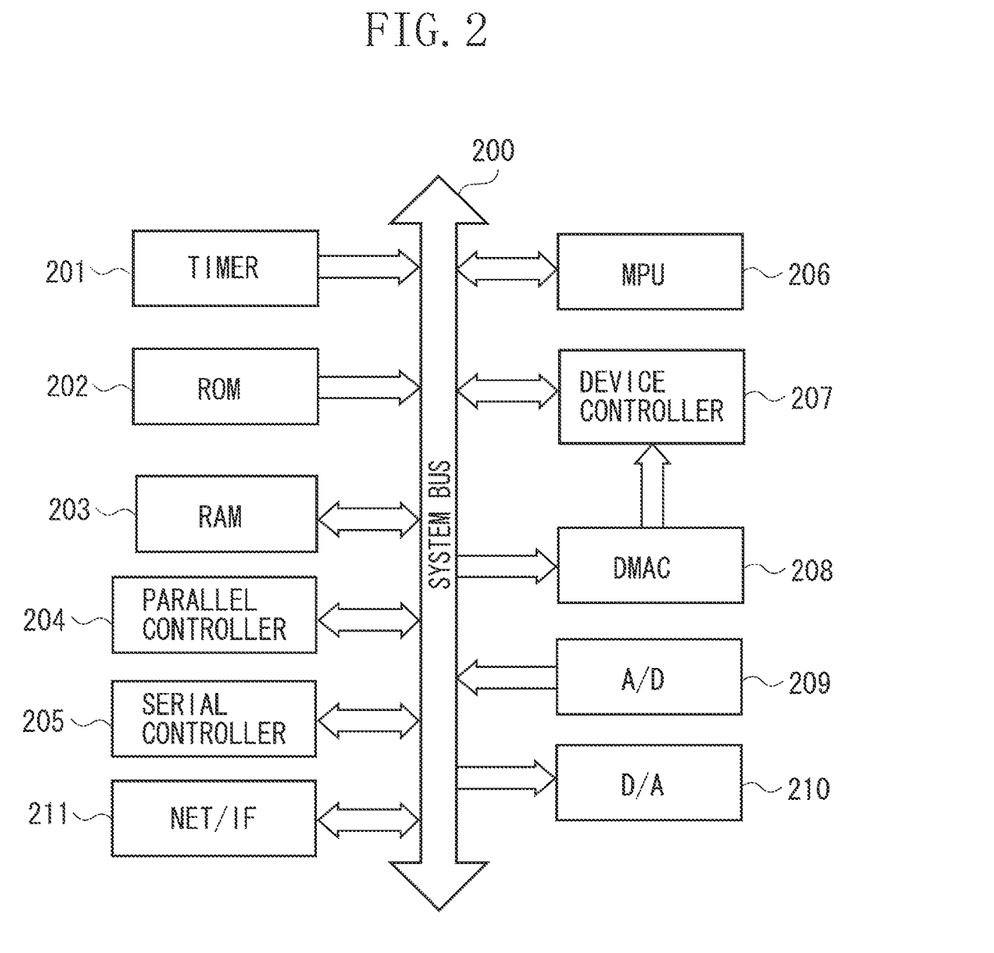
FIG. 2 illustrates an example of a hardware configuration.

FIG. 2 illustrates an example of a standard hardware configuration of an apparatus such as the digital camera 100, the digital television set 101, and the printer 102. The hardware configuration of each apparatus is not limited to the configuration illustrated in FIG. 2.

A system bus 200 is, for example, an address bus, a data bus, and a control bus, and serves to connect the respective units. A timer 201 generates an interruption at a specified time interval. Further, the timer 201 has the so-called watchdog timer function and the time measurement function. A read only memory (ROM) 202 stores codes of programs and invariable fixed data. A random access memory (RAM) 203 temporarily stores, for example, various kinds of data as a main memory. Further, the RAM 203 also serves as an area for storing a program to be executed, an area for use in the execution of the program, and a data area.

A parallel controller 204 inputs and outputs parallel data handled by a micro processor unit (MPU) 206 as it is to an external apparatus. A serial controller 205 outputs parallel data handled by the MPU 206 as serial data, and converts serial data into parallel data to input it.

The MPU 206 sequentially executes instructions of a program, and also controls an interruption. A device controller 207 communicably connects the apparatus with a generally-used external input/output apparatus such as a hard disk and a display. A direct memory access controller (DMAC) 208 controls a direct exchange of data between the memory and an external apparatus.

An analog to digital (A/D) 209 converts analog data into digital data to quantify an amount detected by, for example, a sensor. A digital to analog (D/A) 210 converts digital data into analog data to quantify an operation amount to be output to, for example, an external actuator. A network interface (NET/IF) 211 performs control for enabling data communication between apparatuses via the network, and diagnoses a connection status.

In the present exemplary embodiment, the MPU 206 performs processing according to a procedure of a program stored in, for example, ROM 202, thereby realizing functions of each apparatus and processing according to the sequence that will be described later.

Figure 3:
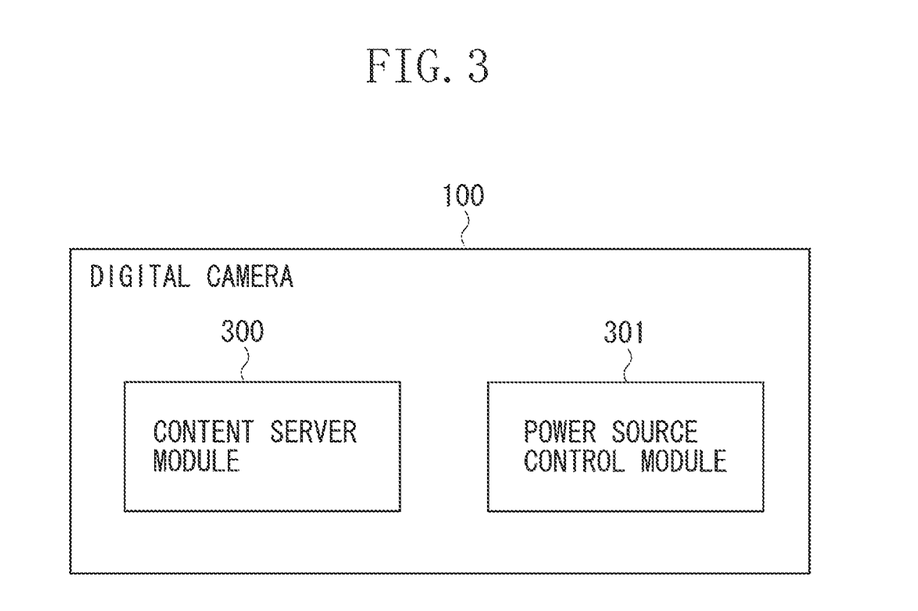
FIG. 3 illustrates an example of a functional configuration of a digital camera.

FIG. 3 illustrates an example of a functional configuration of the digital camera 100.

A content server module 300 realizes a plurality of functions in compliance with the device architecture under the UPnP™ standard with use of, for example, SSDP (Simple Service Discovery Protocol), SOAP (Simple Object Access Protocol), and GENA (General Event Notification Architecture). The details of SSDP, SOAP, and GENA are not provided herein.

The content server module 300, for example, has the digital media server (DMS) function, as defined, for example, by Universal Plug and Play Audio/Video (UPnP™ AV) Architecture version 0.83. This function enables the digital camera 100 to provide captured image data and video data to the digital television set 101 and the printer 102 via the network.

A power source control module 301 manages a power source of the digital camera 100. More specifically, the power source control module 301 controls the power source in such a manner that the digital camera 100 is not set into any of a sleep state, a resume state, or a powered-off state following receipt of an event subscription request under the GENA protocol until receipt of an event subscription cancel request under the GENA protocol.

For example, when the auto power-off function is enabled in the digital camera 100, the power source control module 301 disables the auto power-off function (e.g., stops the timer 201 of the digital camera 100). Then, upon receipt of an event subscription cancel request, the power source control module 301 enables the auto power-off function (e.g., restarts the timer 201 from the stopped time). The auto power-off function is the function for automatically turning off the power source of an apparatus when a time set to the timer 201 of that apparatus has passed.

Figure 4:
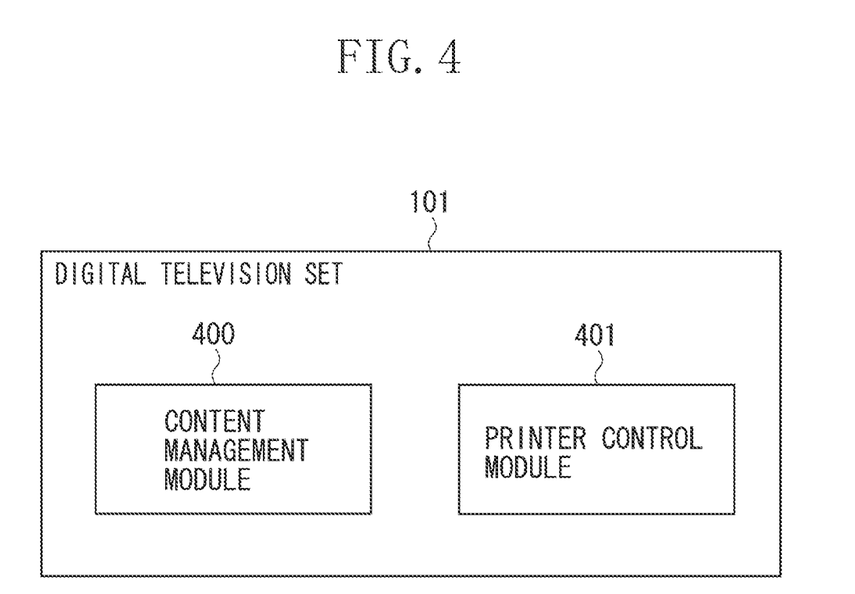
FIG. 4 illustrates an example of a functional configuration of a digital television set.

FIG. 4 illustrates an example of a functional configuration of the digital television set 101.

A content management module 400 realizes a plurality of functions in compliance with the device architecture under the UPnP™ standard with use of, for example, SSDP, GENA, and SOAP. For example, the content management module 400 has the digital media player (DMP) function defined by UPnP™ AV Architecture version 0.83. This function enables the digital television set 101 to reproduce image data and video data captured by the digital camera 100.

Further, the content management module 400 generates a message (e.g., event subscription request) for subscribing an internal state of an apparatus connected to the network, such as the digital camera 100 and the printer 102, and a message (e.g., event subscription cancel request) for stopping the subscription. Then, the content management module 400 transmits a generated message to a corresponding apparatus. The content management module 400 may receive a message issued when a change occurs in the internal state of an apparatus that has been connected before that.

A printer control module 401 has the control point function in Print Basic and Printer Enhanced version 1.0 which are services for printers under the UPnP™ standard. This function enables the printer control module 401 to acquire an image from the digital camera 100, and output a reproduced image to the printer 102 according to a user's specification.

Figure 5:
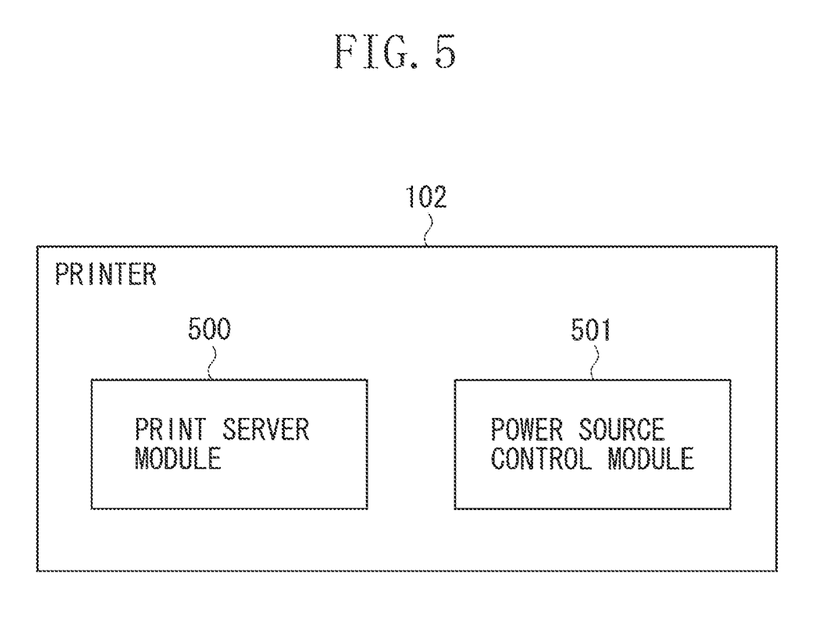
FIG. 5 illustrates an example of a functional configuration of a printer.

FIG. 5 illustrates an example of a functional configuration of the printer 102.

A print server module 500 realizes a plurality of functions in compliance with the device architecture under the UPnP™ standard with use of, for example, SSDP, GENA, and SOAP. For example, the print server module 500 has the function of Print Basic and Printer Enhanced version 1.0 which are services for printers under the UPnP™ standard. This function enables the print server module 500 to print an image captured by the digital camera 100 according to an instruction from the digital television set 101.

A power source control module 501 manages a power source of the printer 102. More specifically, the power source control module 501 controls the power source in such a manner that the printer 102 is not set into any of a sleep state, a resume state, or a powered-off state upon receipt of an event subscription request under the GENA protocol until receipt of an event subscription cancel request under the GENA protocol.

For example, when the auto power-off function is enabled in the printer 102, the power source control module 501 disables the auto power-off function (e.g., stops the timer 201 of the printer 102). Then, upon receipt of an event subscription cancel request, the power source control module 501 enables the auto power-off function (e.g., restarts the timer 201 from the stopped time).

An example of processing regarding an event among the three apparatuses will be described where an image in the digital camera 100 is reproduced on the digital television set 101 and is then printed by the printer 102 in the power source management network system with reference to FIGS. 6 and 7. The present exemplary embodiment is not limited to the processing when a user requests the digital television set 101 to cause the printer 102 to acquire image data from the digital camera 100 and print it. The present exemplary embodiment can be applied to a configuration in which an apparatus as a processing performer (printer 102) is requested to perform processing including an access by the processing performer to a third apparatus that is not a processing requestor (digital television set 101)

Figure 6:
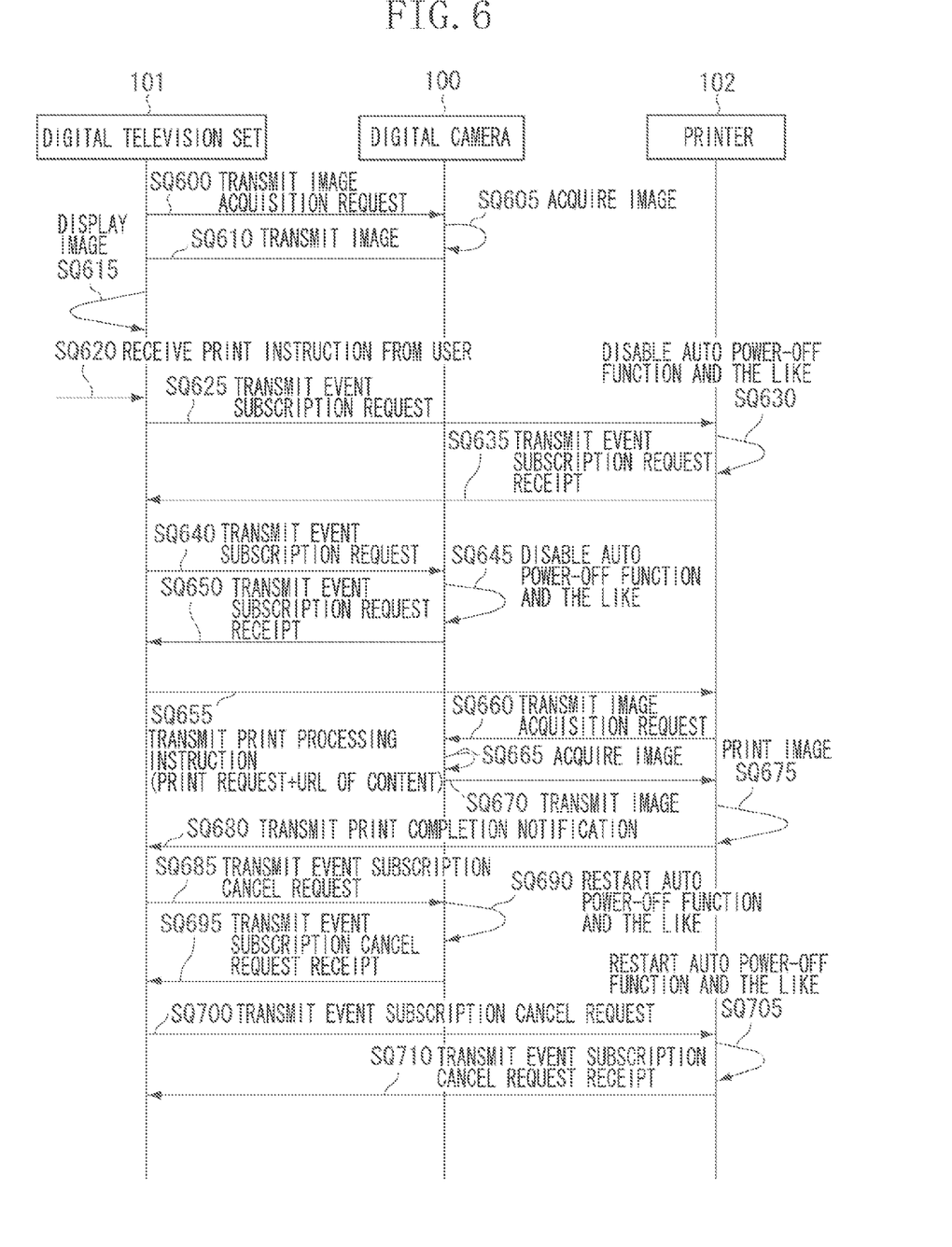
FIG. 6 illustrates an example of a sequence in the power source management network.
Figure 7:
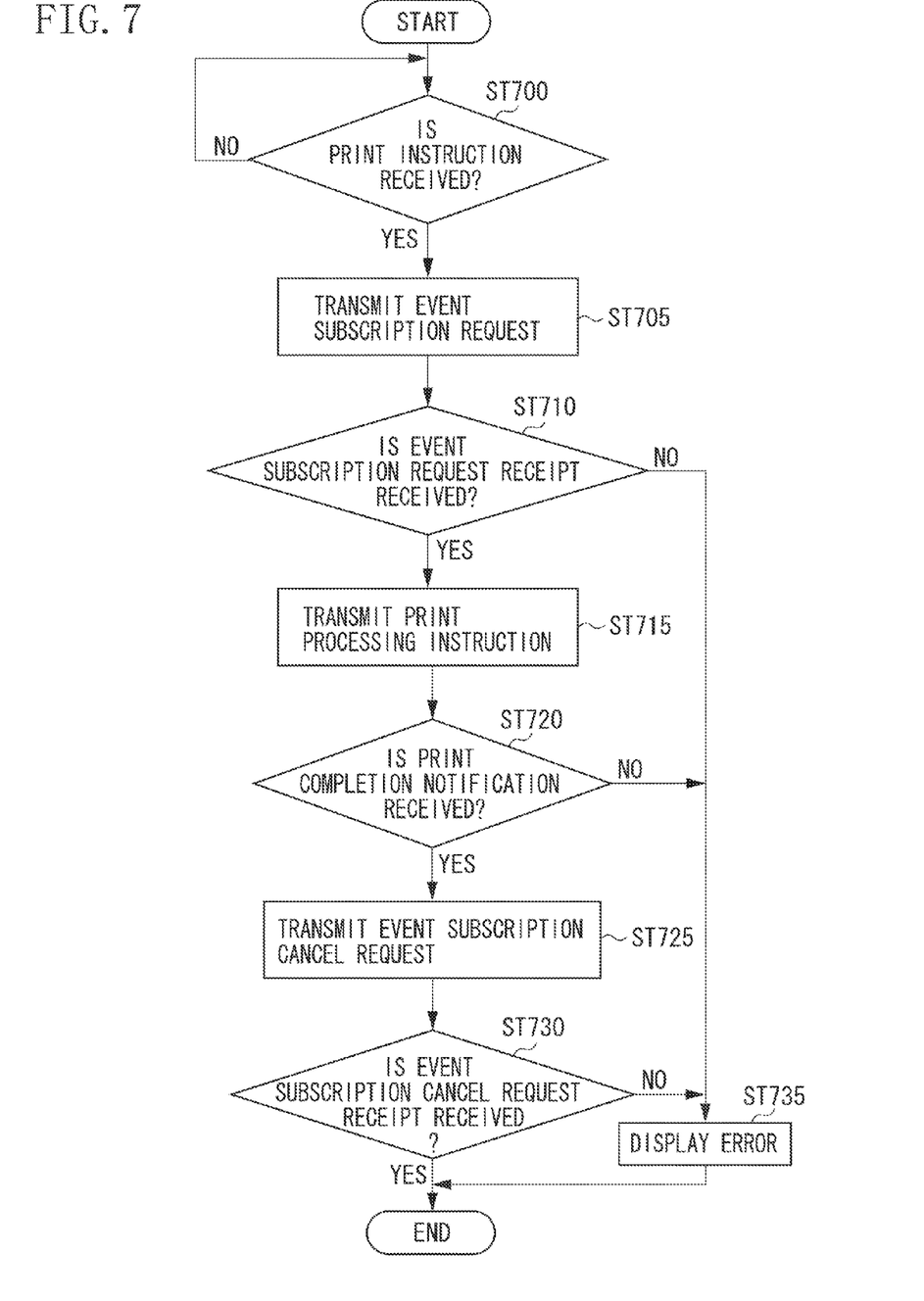
FIG. 7 is a flowchart of the digital television set when a print instruction is input thereto.

FIG. 6 illustrates an example of a sequence in the power source management network system. FIG. 7 is a flowchart of the digital television set 101 when a print instruction is input thereto. FIG. 7 illustrates apart of the program stored in the ROM 202 of the digital television set 101. The MPU 206 of the digital television set 101 is a computer which reads out the program stored in the ROM 202 and executes it. The ROM 202 is a storage medium which stores the program in such a manner that the MPU 206 can read it out therefrom. It should be noted that the auto power-off function is enabled in the digital camera 100 and the printer 102 at this point.

Turning to FIG. 6, in step SQ600, the digital television set 101 requests the digital camera 100 to acquire an image. This request contains, for example, a Uniform Resource Locator (URL) of the image (information about the location where the image is stored). In step SQ605, the digital camera 100 acquires the image from a memory card (not illustrated) connected to the device controller 207, in response to the request (image acquisition request) transmitted from the digital television set 101. Then, in step SQ610, the digital camera 100 transmits the acquired image to the digital television set 101. In step SQ615, the digital television set 101 displays the received image.

At this time, in step SQ620 and step ST700, the digital television set 101 receives a print instruction from a user, which requests printing of the displayed image, through, for example, a remote controller which is an example of the external input/output apparatus, or an input screen displayed on the display apparatus. In step SQ625, step SQ640, and step ST705, upon receipt of the print instruction, the digital television set 101 transmits an event subscription request (request for an event generation notification) to the digital camera 100 and the printer 102 through the content management module 400. FIG. 6 illustrates the processing in such a manner that the digital television set 101 transmits this request to the printer 102 before transmitting this request to the digital camera 100, but the order of these steps is not limited thereto.

In step SQ630, upon receipt of the event subscription request through the print server module 500, the printer 102 disables the auto power-off function and the like through the power source control module 501, and controls the power source of the printer 102 so that the power source is not turned off. The event subscription request contains a valid time, and the auto power-off function of the printer 102 is enabled again once this valid time has passed. Next, in step SQ635, the printer 102 transmits receipt of an event subscription request to the digital television set 101 through the print server module 500.

In step SQ645, upon receipt of the event subscription request through the content server module 300, the digital camera 100 disables the auto power-off function and the like through the power source control module 301, and controls the power source of the digital camera 100 so that the power source is not turned off. The event subscription request contains a valid time, and the auto power-off function of the digital camera 100 is enabled again once this valid time has passed. Next, in step SQ650, the digital camera 100 transmits receipt of an event subscription request to the digital television set 101 through the content server module 300.

If the digital television set 101 receives the receipt of event subscription request from each of the printer 102 and the digital camera 100 (YES in step ST710), in step SQ655 and step ST715, the digital television set 101 transmits a print processing instruction to the printer 102 through the printer control module 401 so as to cause the printer 102 to print the image specified by the print instruction. The print processing instruction contains a print request and information about the location where the image is stored. If the digital television set 101 does not receive a receipt of event subscription request as a reply to the event subscription request (NO in step ST710), in step ST735, the digital television set 101 displays that the print operation has failed. More specifically, if the digital television set 101 does not receive a receipt of event subscription request from the printer 102, the digital television set 101 displays a message that the printer 102 is unresponsive. If the digital television set 101 does not receive the receipt of event subscription request from the digital camera 100, the digital television set 101 displays the message that the digital camera 100 is unresponsive. If the digital television set 101 receives the receipt of event subscription request from the printer 102, but does not receive the receipt of event subscription request from the digital camera 100, the digital television set 101 transmits an event subscription cancel request to the printer 102.

In step SQ660, upon receipt of the print processing instruction through the print server module 500, the printer 102 transmits a request (image acquisition request) to acquire the image specified by the print instruction to the digital camera 100 with use of the URL of the image contained in the print processing instruction.

In step SQ665, in response to the image acquisition request, the digital camera 100 acquires the image specified by the print instruction through the content server module 300. Then, in step SQ670, the digital camera 100 transmits the acquired image to the printer 102. After that, in step SQ675, the printer 102 prints the acquired image through the print server module 500. In step SQ680, upon detection of a change in the internal state of the printer 102 when the print operation is completed, the printer 102 transmits an event message (print completion notification), which indicates that the print operation is ended (completed), to the digital television set 101 through the print server module 500.

If the digital television set 101 receives the print completion notification through the content management module 400 (YES in step ST720), the digital television set 101 determines that the print operation is completed in the printer 102. Then, in step SQ685, step SQ700, and step ST725, the digital television set 101 transmits an event subscription cancel request to the digital camera 100 and the printer 102. FIG. 6 illustrates the processing in such a manner that the digital television set 101 transmits this request to the digital camera 100 before transmitting this request to the printer 102, but the order of these steps is not limited thereto. On the other hand, if the digital television set 101 does not receive a print completion notification (NO in step ST720), in step ST735, the digital television set 101 displays a message that the print operation has failed. Further, in this case, the digital television set 101 transmits an event subscription cancel request to the printer 102 and the digital camera 100.

In step SQ690, upon receipt of the event subscription cancel request through the content server module 300, the digital camera 100 returns the auto power-off function and the like to an enabled state through the power source control module 301. Next, in step SQ695, the digital camera 100 transmits receipt of an event subscription cancel request to the digital television set 101 through the content server module 300.

In step SQ705, upon receipt of the event subscription cancel request through the print server module 500, the printer 102 returns the auto power-off function and the like to an enabled state through the power source control module 501. Next, in step SQ710, the printer 102 transmits receipt of event subscription cancel request to the digital television set 101 through the print server module 500.

If the digital television set 101 receives the receipt of event subscription cancel request from each of the digital camera 100 and the printer 102 (YES in step ST730), the digital television set 101 ends the processing for printing the image in the digital camera 100. On the other hand, if the digital television set 101 does not receive the receipt of event subscription cancel request from either the digital camera 100 or the printer 102 (NO in ST730), in step ST735, the digital television set 101 displays the apparatus from which the digital television set 101 does not receive the receipt of event subscription cancel request, and displays a prompt for a user to check the status of that apparatus.

According to the above-mentioned configuration, the power source management network system of the present exemplary embodiment is effective and useful, for example, when a user prints a favorite image while viewing images stored in a DMS (e.g., a digital camera) equipped with the auto power-off function on a DMP such as a digital television set (TV). In particular, images are often cashed in a TV, and therefore a certain time has already passed in some cases when a user issues a print instruction. In these cases, this power source management network system can prevent the DMS from shutting down in the middle of the print operation to cause a failure in the print operation.

According to the above-mentioned configuration, it is possible to limit power consumption to a required period while keeping the auto power-off function enabled without requiring an apparatus equipped with the auto power-off function to constantly stay turned on, and thereby it is possible to save power consumption of the apparatus which works on a battery.

Further, the present invention can be also embodied by performing the following procedure. A software application (or program) capable of realizing the functions of the above-described exemplary embodiment is supplied to a system or an apparatus via a network or various kinds of computer-readable storage media, and a computer (or, for example, a central processing unit (CPU) or a MPU) of the system or the apparatus reads out and executes the program.

According to the above-described configuration of the present exemplary embodiment, it is possible to more effectively avoid occurrence of such a situation that processing is not completed in a system including three or more apparatuses that can function in cooperation with one another.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-177498 filed Aug. 6, 2010, which is hereby incorporated by reference herein in its entirety.

What is claimed is:

1. A method performed by a second apparatus connected to a first apparatus and a third apparatus for requesting the first apparatus to perform processing, the method comprising:

transmitting, before requesting the first apparatus to perform processing including an access to the third apparatus, an event subscribe request from the second apparatus to the third apparatus, for preventing the third apparatus from performing a predetermined power control operation prior to receiving an event subscribe cancel request, via a network utilizing General Event Notification Architecture (GENA);

receiving a response transmitted by the third apparatus in response to the event subscribe request;

requesting, after the response to the event subscribe request is received from the third apparatus, the first apparatus from the second apparatus to perform the processing including the access to the third apparatus;

receiving, from the first apparatus, a notification of an end of the processing; and transmitting, after the notification is received from the first apparatus, the event subscribe cancel request from the second apparatus to the third apparatus, via the network utilizing General Event Notification Architecture (GENA).

2. The method according to claim 1, wherein requesting the first apparatus from the second apparatus to perform the processing comprises requesting the first apparatus from the second apparatus to perform processing for acquiring data from the third apparatus to print the data.

3. A non-transitory computer-readable storage medium for storing a computer program that causes a second apparatus, which is connected to a first apparatus and a third apparatus, to request the first apparatus to perform processing, the computer program comprising:

transmitting, before requesting the first apparatus to perform processing including an access to the third apparatus, an event subscribe request from the second apparatus to the third apparatus, for preventing the third apparatus from performing a predetermined power control operation prior to receiving an event subscribe cancel request, via a network utilizing General Event Notification Architecture (GENA);

receiving a response transmitted by the third apparatus in response to the event subscribe request;

requesting, after the response to the event subscribe request is received from the third apparatus, the first apparatus from the second apparatus to perform the processing including the access to the third apparatus;

receiving, from the first apparatus, a notification of an end of the processing; and transmitting, after the notification is received from the first apparatus, the event subscribe cancel request from the second apparatus to the third apparatus, via the network utilizing General Event Notification Architecture (GENA).

4. The non-transitory computer-readable storage medium according to claim 3, wherein requesting the first apparatus from the second apparatus to perform the processing comprises requesting the first apparatus from the second apparatus to perform processing for acquiring data from the third apparatus to print the data.

5. A second apparatus connected to a first apparatus and a third apparatus via a network, the second apparatus comprising:

an input unit configured to input an instruction to the first apparatus;

a reception unit configured to receive a notification from the first apparatus; and a transmission unit configured to transmit, before requesting the first apparatus to perform processing including an access to the third apparatus, an event subscribe request for preventing the third apparatus from performing a predetermined power control operation prior to receiving an event subscribe cancel request, utilizing General Event Notification Architecture (GENA), to the third apparatus based on the instruction, and to request, after a response to the event subscribe request is received from the third apparatus, the first apparatus to perform the processing including the access to the third apparatus, and transmit, after a notification of an end of the processing is received from the first apparatus, the event subscribe cancel request, utilizing General Event Notification Architecture (GENA) to the third apparatus.

* * * * *